H. B. VAN DAALEN & H. P. SCHREIBER.
APPARATUS FOR THE ELECTRICAL TRANSMISSION OF POWER.
APPLICATION FILED OCT. 23, 1912.
1,223,224.
Patented Apr. 17, 1917.
4 SHEETS—SHEET 3.
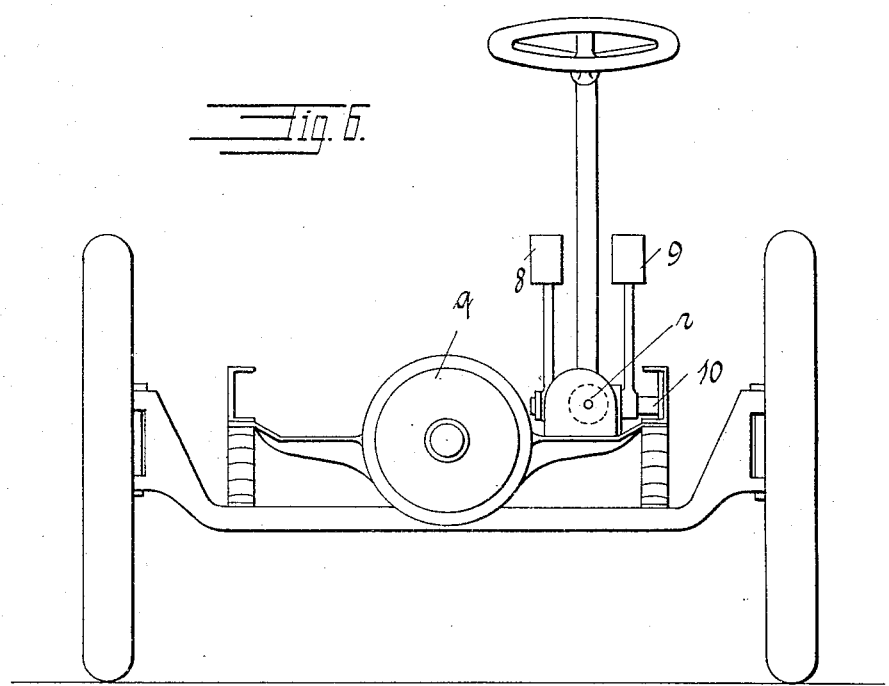
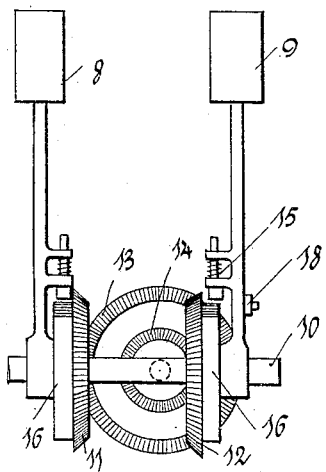
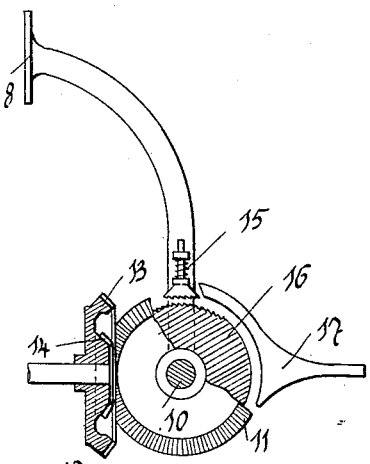
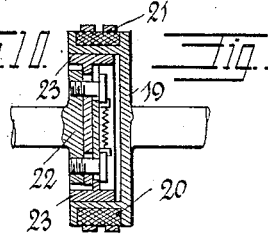
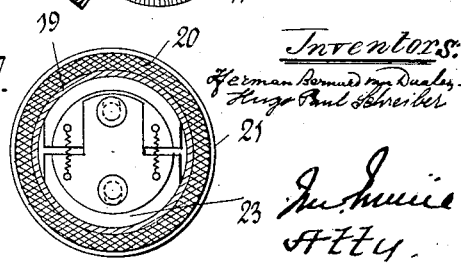
THE NORRIS PETERS CO., PHOTO-LITHO., WASHINGTON, D. C.

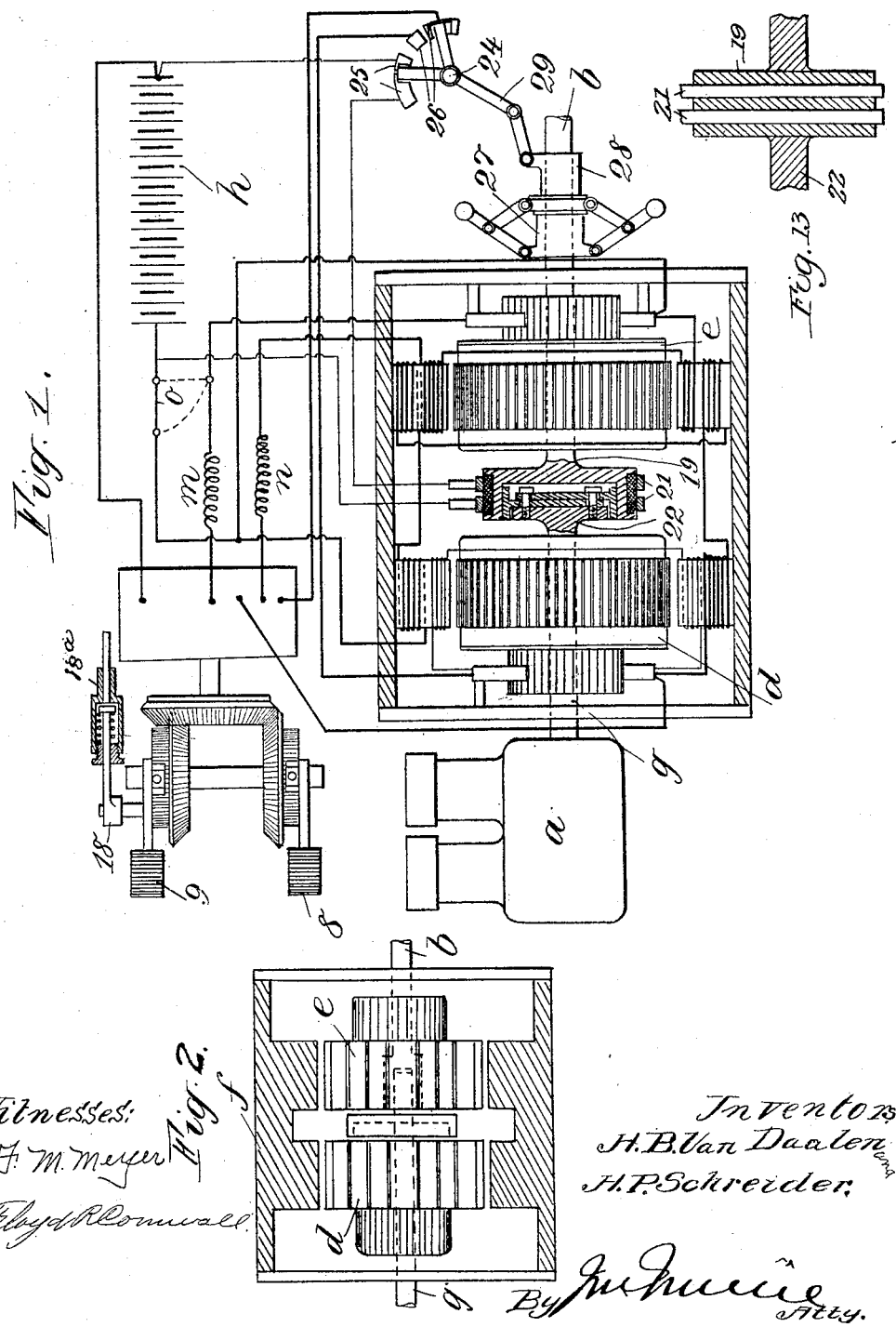

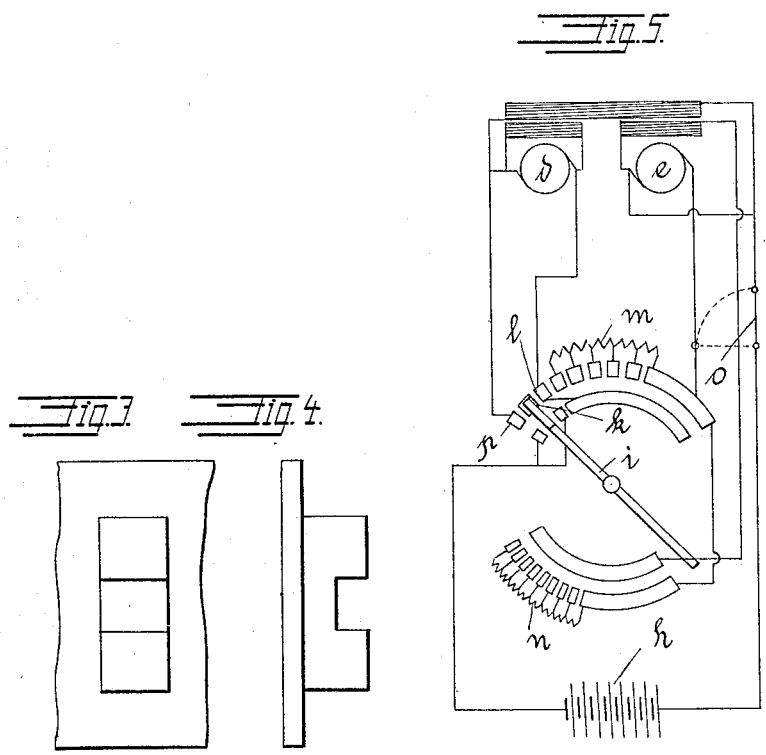

H. B. VAN DAALEN & H. P. SCHREIBER.
APPARATUS FOR THE ELECTRICAL TRANSMISSION OF POWER.
APPLICATION FILED OCT. 23, 1912.
1,223,224.
Patented Apr. 17, 1917.
4 SHEETS—SHEET 4.
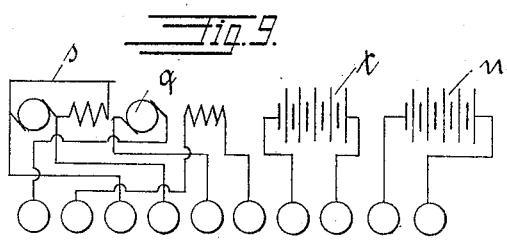
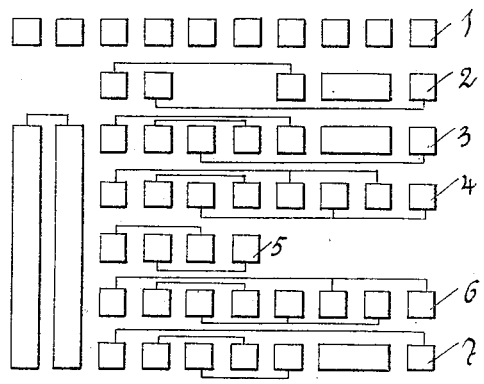
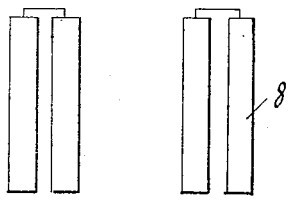
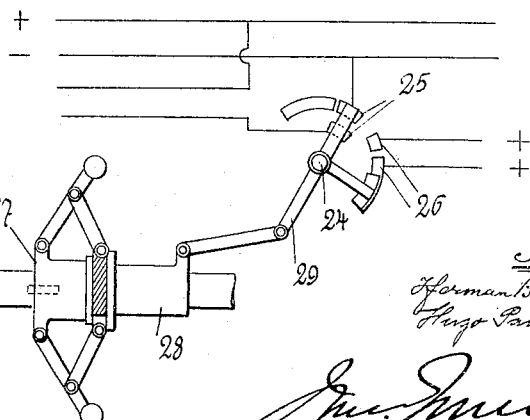
Witnesses:
Inventors:
Herman Bernard van Daalen
Hugo Paul Schreiber

UNITED STATES PATENT OFFICE.

HERMAN BERNARD VAN DAALEN AND HUGO PAUL SCHREIBER, OF LONDON, ENGLAND.

APPARATUS FOR THE ELECTRICAL TRANSMISSION OF POWER.

1,223,224.	Specification of Letters Patent.	Patented Apr. 17, 1917.

Application filed October 23, 1912. Serial No. 727,397.

*To all whom it may concern:*

Be it known that we, HERMAN BERNARD VAN DAALEN and HUGO PAUL SCHREIBER, subjects of the King of England, and residing at London, W., England, have invented certain new and useful improvements in apparatus for the electrical transmission of power, with more particular reference to the application of dynamo-electric machines for the combined purpose of electrical and direct transmission of power, variation and regulation of mechanically-produced power, generation of electric current, electric braking, and starting of gas or vapor driven engines.

The present invention has for its object to provide a simplified form of construction of apparatus to perform the above mentioned functions, and comprises a dynamo electric machine having two armatures capable of independent rotation and a single stationary field the intensity of which can be varied as desired.

The invention also consists in an arrangement of an electric battery in the circuit in such a manner that surplus energy may be absorbed thereby when the whole power of the prime mover which operates under approximately constant load is not required to drive the vehicle while the power thus absorbed may be utilized for the propulsion of the vehicle when additional power is required, as, for example, when climbing hills, or at starting, when a large starting torque is required.

The invention also consists in other details hereinafter more particularly referred to.

The accompanying drawings illustrate one convenient mode of carrying out the invention.

Figure 1 is a view partly in section, partly in elevation, and partly diagrammatic, showing one embodiment of the invention.

Fig. 2 is a detail view partly in elevation and partly in section, illustrating the preferred form of pole piece.

Fig. 3 is a face view of such a pole piece.

Fig. 4 is a side elevation of such a pole piece.

Fig. 5 is a diagrammatic view of the generator, motor, controllers, and the wiring connections.

Fig. 6 is a skeleton view of the device on the chassis of a vehicle.

Figs. 7 and 8 are respectively a front elevation and a side elevation, partly in section, showing certain bevel gears used in connection herewith.

Fig. 9 is a view showing a modified form of controller connections.

Fig. 10 is a detail section through the axis of the clutch.

Fig. 11 is a front elevation partly in section of the clutch.

Fig. 12 is a view partly in elevation and partly in section, showing a centrifugally operated controlling device arranged for use herewith.

Fig. 13 illustrates a modified form of clutch.

In carrying our invention into effect in one convenient manner, we interpose between the engine $a$, which may, for example, be a petrol engine, and the shaft or other member $b$ to be driven, the dynamo electric machine $c$ which, as shown in Figs. 1 and 3, comprises two armatures $d$ $e$ and a single stationary field magnet $f$, the two armatures being so mounted, the one on the shaft $g$ of the engine and the other on the driven shaft $b$, as to be capable of independent rotation though adapted, when required, to be coupled together by means of any suitable form of clutch so that the shaft $g$ drives the shaft $b$ directly.

The poles of the stationary field magnet $f$ are divided as shown in Fig. 2 and are, as illustrated in Figs. 1 and 5, compound wound, in which the large windings are series windings, and the small windings are shunt windings. The series windings serve to keep the voltage nearly constant in the generator, and in the motor give the latter the characteristic of a series motor after the shunt winding has been cut out. The shunt winding of the motor is effective for regulating the speed and for braking purposes. The arrangement for the connections, as shown in said Fig. 5, is such that when the apparatus is in operation the armature $d$, with the adjacent portion of the field, acts as a generator, supplying current to the armature $e$, which in conjunction with the adjacent portion of its field, acts as a motor.

If the rate of rotation of the armature $d$ and the field adjacent thereto be kept constant we can vary the speed of the armature $e$ and therefore that of the shaft $b$ by varying the current in the armature either by changing the resistance in the armature circuit or by varying the strength of that part of the field adjacent thereto so that we can vary the speed of the driven shaft while keeping the speed of the prime mover constant. At the highest speeds it will be understood that the two armatures may be coupled together by a suitable clutch such as is described hereafter whereby direct transmission of power is effected from the engine to the driven member.

Any ordinary means, such as a starting handle, may be employed to start the engine $a$ but we prefer to employ a battery $h$ (Figs. 1 and 6) which at starting is connected to the armature $d$ and the field by moving the controller arm $i$ on to the starting contact $l$ whereby the armature $d$ acts as a motor armature tending to drive the engine which is thus started and then drives the armature $d$ as a generator.

When the engine is started, the controller arm is moved to the next contact $l^1$ when the generator is connected to the motor so causing the driven shaft $b$ to rotate. By moving the controller lever still farther resistance $m$ is cut out of the motor armature circuit so increasing the driving power while still further movement causes resistance $n$ to be put in the shunt field winding of the motor circuit thereby reducing the strength of the motor field with a consequent increase in the armature speed.

If the position of the throw-over switch $o$ be altered to the position shown in Fig. 5 and the controller arm be moved on to the contact $p$ the battery is connected to the motor armature, the direction of rotation of which is reversed so enabling the direction of motion of the driven shaft $b$ to be reversed.

It will be understood that at the highest speeds the two armatures may be directly coupled together by means of a suitable clutch, for instance such as illustrated in Figs. 1 and 13 of the drawings, thereby effecting a direct transmission of the engine power to the shaft or other member to be driven.

In the example illustrated, we provide a petrol engine coupled in any convenient and known manner to a suitable generator serving to provide the necessary current for the electric motor $q$ coupled to the driving shaft of the road wheels and in conjunction with these old and well known parts we provide a secondary or storage battery so arranged as to store the surplus energy to be used at those times when the driving motor is called upon to meet abnormal conditions as, for example, at starting or when climbing hills as will more clearly be pointed out hereafter when considering the controller connections. The controller $r$ (shown diagrammatically in Fig. 9) may be of any usual construction and provided with contacts and wipers such that the controller may fulfil the various functions required of it. Considering the diagram of controller connections given in Fig. 11 in which $s$ is the generator, $q$ the motor, and $t\ u$ the secondary or storage battery conveniently divided into two parts, it will be seen that the controller proper has seven positions 1, 2, 3, 4, 5, 6, 7, while the portion marked 8 illustrates the contacts for electric braking. In the position 1 the controller is in the neutral position and the vehicle is at rest.

On moving the controller to the position 2 the current from the battery $t\ u$ traverses the generator $s$ causing the latter to act as a motor and start the prime mover of the vehicle, the vehicle still remaining at rest. In the position 3 the vehicle commences to move slowly, the motor receiving only a small portion of the current from the generator which is in this position in condition for charging the storage battery $t\ u$. In the position 4 the two halves of the storage $t\ u$ are arranged in parallel so that the motor receives more of the current from the generator and thus increases its speed while when the controller is in the position 5 the battery is cut out of the circuit and the motor receives the maximum current from the generator. When additional energy is required for the propulsion of the vehicle the controller may be moved into either of the positions 6, 7, in the first of which 6 the two halves of the battery being in parallel are connected in series with the generator so that they provide the motor $q$ with a certain amount of additional energy. In the position 7 the halves of the battery are in series with one another and with the generator so that a still larger amount of additional energy is provided for the motor.

Any convenient means may be provided for operating the controller but we prefer to use mechanism such as that illustrated in Figs. 7 and 8 wherein are employed two pedals 8, 9, loosely mounted upon a shaft 10 upon which are rigidly mounted two bevel wheels 11, 12, adapted to gear with corresponding bevel wheels 13, 14, mounted upon the operating shaft with spring-controlled pawls or pawl-like devices 15 provided with teeth adapted to engage ratchet teeth upon the disks 16 formed integral with or secured to the bevel wheels 11, 12. The pedal 8 is employed for rotating the controller from the neutral position 1 to the position 7, such rotation being effected through the medium of the pawl 15 depressed by engagement with the guard 17 until it engages with the ratchet teeth upon the disk 16, and the bevel wheel 11, gearing with the bevel wheel 13 upon the controller spindle. The pedal 9 is employed for operating the electric brake and it will be seen that depression of this latter pedal causes the controller spindle to move in the opposite direction and owing to the fact that the bevel wheel 14 is considerably smaller than the bevel wheel 13 the amount of rotary movement imparted to the controller spindle for a certain angular movement of the pedal 9 is considerably greater than that with an equal angular movement of the pedal 8; thus, upon depressing the brake pedal 9 the controller spindle—assuming that the controller is not in the neutral position—will first be moved so that the controller assumes the neutral position and thereafter it will be moved into the braking position. Thus it will be seen that with our improved arrangement it is impossible to apply the electric brake until after the controller has assumed its neutral position so that the apparatus is rendered entirely fool-proof.

The connection of the mechanical brake (when such is employed) with the electric braking device may be conveniently made by means of any suitable link mechanism 18a (Fig. 1) attached to the brake pedal arm by means of a suitable pin or lug 18, and it is to be noted that with such an arrangement the electric and mechanical brakes may be actuated by the one operating member either simultaneously, or, if desired, successively by the use of a suitable lost motion connection for the mechanical brake.

When constructing a clutch suitable for petrol-electric vehicles or for other purposes, we provide an electro-magnetic clutch which may be of any suitable form, the two parts of which are respectively connected with the driving shaft and the driven shaft of the vehicle.

In one convenient construction as illustrated by way of example in Figs. 12 and 13, one portion 19 of the clutch may be surrounded by an excitation coil 20 to which current may be supplied from a convenient source of electric energy, such as a battery through the medium of slip-rings 21 or the like, while the other member 22 of the clutch forms, or is provided with, one or more armatures 23 adapted to be attracted in either a radial, as shown in Fig. 10, or longitudinal direction, as shown in Fig. 13, as desired so as to make contact with the part 19 of the clutch when the latter is magnetized owing to the energizing of the coil 20.

If desired the battery circuit may be completed by hand but inasmuch as in petrol electric systems particularly the clutch is only required to operate when the two revoluble members are rotating at approximately equal speeds the clutching and unclutching is preferably effected automatically and in one convenient arrangement for attaining this object we provide an electric switch 24 (Fig. 12) in conjunction with two sets of contacts, one set 25 being in the battery circuit. Upon the driven shaft of the vehicle or auxiliary shaft in connection therewith we mount a governor 27 of any convenient construction and to the governor sleeve 28 or other movable member we connect the electric switch 24 by means of a suitable link or lever mechanism 29, the arrangement being such that when the driven shaft rotates at a predetermined speed the governor 27 operates to move the electric switch 24 so that the battery is connected with the energizing coil of the electro-magnetic clutch while the generator circuit is simultaneously broken so that the two members are now directly coupled together with the result that the drive is transmitted direct from the engine to the road wheels without the use of the intermediate electrical transmission.

It is to be understood that the construction of the various auxiliary parts comprised in our improved clutching mechanism may be varied, as we may employ with equal advantage and like effect any suitable form of electro-magnetic clutch and any suitable type of governor or of electric switch operated by the same; for example, we may, if desired, employ a switch operated upon the quick-make and quick-break principle to obviate any disadvantages that might arise due to excessive sparking of the contacts, or switches may be employed with the contacts mounted upon a revoluble drum.

Other modes of applying the principle of our invention may be employed instead of the one explained, change being made as regards the mechanism herein disclosed without passing beyond our invention.

Fig. 1 illustrates diagrammatically an apparatus for propelling a road vehicle, the apparatus showing a petrol engine $a$ with its shaft $g$ on which is mounted an armature $d$ opposite and in line with a second armature $e$ mounted on another shaft $b$, called the driving shaft. Interposed between the two armatures is an electro-magnetic clutch with its parts 19, 20 and 21 mounted on and revolving with the shaft $b$ and with its parts 22 and 23 mounted on and revolving with the shaft $g$. On the shaft $b$ is also mounted the governor 27 which, being connected to the switch 24, is made to automatically operate the clutch. The battery $h$ is connected to supply current to the electric machine and to the electro-magnetic clutch, and to be recharged by the electric machine. The parts $m$, $n$ represent resistance in the motor circuit for varying the speed of the motor. $o$ is a switch for reversing the direction of rotation of the motor armature. The connections show the electric circuit during the period of direct drive, when the two armatures are coupled by the operation of the electro-magnetic clutch and when through the operation of the switch 24 the generator circuit is opened. (The circuit connections required for starting the engine and running the vehicle are shown in Fig. 5). The pedals 8 and 9 control all the functions of the apparatus shown in this Fig. 1.

Having now fully described and ascertained our said invention and in what manner the same is to be performed, we declare that what we claim is:

1. Apparatus for the electric and direct transmission of power comprising a dynamo electric machine having two armatures capable of independent rotation and a single stationary field, the one armature working as a generator and the other as a motor, an engine coupled in any convenient manner to the generator for driving it, a shaft to be driven by the motor, a battery for the purpose specified and a controller in combination with a brake mechanism for effecting the regulation of the various speeds, the brake mechanism being so arranged that braking cannot take place until the controller has resumed its neutral position, substantially as described.

2. Apparatus for the electric and direct transmission of power comprising a dynamo electric machine having two armatures capable of independent rotation and a single stationary field, the one armature working as a generator and the other as a motor, an engine coupled in any convenient manner to the generator for driving it, a shaft to be driven by the motor, a battery for the purpose specified, and a controller in combination with a brake mechanism, the said brake mechanism being capable of acting successively as an electrical and as a mechanical brake, substantially as described.

HERMAN BERNARD van DAALEN.
HUGO PAUL SCHREIBER.

Witnesses:
WOLDEMAR HAUPT,
HENRY HASPER.

Copies of this patent may be obtained for five cents each, by addressing the "Commissioner of Patents, Washington, D. C."